United States Patent
Bennett et al.

(10) Patent No.: US 8,106,820 B2
(45) Date of Patent: Jan. 31, 2012

(54) PERSONAL LOCATOR AND LOCATING METHOD

(75) Inventors: Robert S. Bennett, Half Moon Bay, CA (US); Joseph Rembert, III, San Jose, CA (US); Paul A. Monte, San Jose, CA (US)

(73) Assignee: Globalstar, Inc., Milpitas, CA (US)

( * ) Notice: Subject to any disclaimer, the term of this patent is extended or adjusted under 35 U.S.C. 154(b) by 325 days.

(21) Appl. No.: 12/215,462

(22) Filed: Jun. 27, 2008

(65) Prior Publication Data

US 2009/0121930 A1 May 14, 2009

Related U.S. Application Data

(60) Provisional application No. 60/966,350, filed on Aug. 27, 2007.

(51) Int. Cl.
*G01S 19/35* (2010.01)
*H04W 4/02* (2009.01)

(52) U.S. Cl. ............ 342/357.52; 342/357.75; 455/414.1

(58) Field of Classification Search ............ 342/357.55, 342/357.75, 357.76, 357.77, 357.52; 715/864; 455/3.02, 404.1, 404.2, 414.1, 414.2, 427, 455/456.6; *G01S 19/14, 19/35; H04W 4/02*
See application file for complete search history.

(56) References Cited

U.S. PATENT DOCUMENTS

| | | | |
|---|---|---|---|
| 5,414,432 A * | 5/1995 | Penny et al. | 342/357.59 |
| 5,914,675 A * | 6/1999 | Tognazzini | 340/989 |
| 7,042,338 B1 * | 5/2006 | Weber | 340/309.5 |
| 7,053,822 B2 * | 5/2006 | Rickerson, Jr. | 342/357.54 |
| 2004/0072583 A1 * | 4/2004 | Weng | 455/456.3 |
| 2006/0229109 A1 * | 10/2006 | Oesterling et al. | 455/569.2 |
| 2007/0101274 A1 * | 5/2007 | Kurlander et al. | 715/744 |
| 2007/0257889 A1 * | 11/2007 | Croy | 345/170 |

* cited by examiner

*Primary Examiner* — Thomas Tarcza
*Assistant Examiner* — John Vigushin
(74) *Attorney, Agent, or Firm* — Perman & Green, LLP (57) ABSTRACT

Disclosed are systems; apparatus and methods for tracking or locating a person that is lost or has an emergency. Personal locating apparatus is employed comprising a plurality of buttons, and/or a keypad and display, that define an on/off element, an OK element, a help element and a 911 emergency element, wherein the elements are used to select and deselect one of a predetermined number of operational modes. A global positioning system (GPS) receiver in the apparatus processes GPS signals received from GPS satellites to generate location data indicative of the location of the apparatus. A satellite transmitter is coupled to the processor that transmits the location data and a desired operational mode signal to a remotely located processing center via one or more communication satellites. A processor is coupled to the GPS receiver and the satellite transmitter that is programmed to respond to user selections to generate the desired operational mode signal, process the location signals from the GPS receiver, the desired operational mode signal, and optionally a user message, generate a signal for transmission to the processing center, and transmit the signal to the remotely located processing center via one or more communication satellites. The message is processed at the processing center and sent as an email message to one or more designated email addresses, as a short message service (SMS) message to one or more designated cell phones, or as a message to a 911 emergency center.

22 Claims, 6 Drawing Sheets

PERSONAL LOCATOR AND LOCATING METHOD

This application claims the benefit of U.S. Provisional Application No. 60/966,350, filed Aug. 27, 2007.

BACKGROUND

The present invention relates generally to apparatus and methods for tracking and locating a person that is lost or has an emergency.

People can easily get into emergency situations when they are in a remote environment. News services have reported many such incidents, many ending with unfortunate results.

For example, on Dec. 6, 2007, CNN.com reported "Missing CNet Editor James Kim Found Dead in Oregon Mountains—How can an entire family go missing over a Thanksgiving road trip? That's just what happened to a family of four—mom, dad, 4-year-old, 7-month-old. Then a miracle, the mom and two children found, surviving by burning the car tires for warmth. After a massive search, tonight we learn the father, 35-year-old James Kim's body, has been spotted there in the Pacific Northwest wilderness."

On Dec. 12, 2006, CNN.com reported "Tonight, three men stranded on treacherous Mt. Hood, Oreg., two from Dallas, one from Brooklyn, last known alive in a cave hollowed out of ice and snow two miles above sea level, 2,000 miles from home."

On Dec. 21, 2006, NewsMax.com Wires reported "MOUNT HOOD RIVER, Ore.—Rescue teams gave up any hope of finding two missing climbers alive on stormy Mount Hood and abandoned the frustrating, 9-day-old search Wednesday at the request of the men's families."

On Jul. 1, 2007, News4Jax.com reported "1 Man Rescued, Another Missing At Vilano Beach Crews Call Off Rescue Effort For Lost Fisherman. After nearly eight hours of searching, rescuers at Vilano Beach called off search efforts for a fisherman who was last seen at about noon Sunday."

On May 10, 2006, MSNBC reported "IDYLLWILD, Calif.—Two lost hikers who survived three nights in the frigid San Jacinto Mountains said they stumbled upon the campsite of a man who vanished a year ago and were able to scavenge food, clothes and matches from his backpack."

On Nov. 28, 2004, the Clackamas County Sheriffs Office reported "Hiker lost five days in freezing weather on Mount Hood. Sylvia Hillebrand set out alone on a hike from a trailhead near the Trillium Lake snow park area. Hillebrand was wearing a winter coat and tennis shoes; she was not dressed appropriately for the winter weather conditions."

On Mar. 4, 2003, the Clackamas County Sheriffs Office reported "Portland athlete feared lost snowshoeing on Mt. Hood. SEARCH FAILS TO FIND SNOWSHOER ON MOUNT HOOD. More than 50 people and an Army helicopter scoured a flank of Mount Hood on Monday for a 49-year-old Portland snowshoer who disappeared Sunday.

These unfortunate people did not have the ability to summon help when they most needed it. Even if the people had a cell phone, in many cases, it is likely that service would not be available at their location.

While cell phones can provide location information that can be used by police or other emergency personnel, they are limited to use within cellular coverage areas, and are relatively expensive. Cell phones are not particularly appropriate for outdoor enthusiasts, maritime areas or for people who in areas with no cellular service due to remote locations or after a disaster when cellular is unavailable. This includes all cellular messaging solutions such as OnStar® service.

While there are some satellite-based solutions, such as ePirbs/PLB, for example, these services are expensive and are limited in their available functions. For example, they do not allow the user to check in nor do they track the user. GPS navigation devices tell you where you are, but cannot page for help. Satellite phones and modems are useful, but are expensive and bulky.

It would therefore be desirable to have apparatus and methods that cost-effectively identify the location of a person that is lost or has an emergency. It would also be desirable to have apparatus and methods that cost-effectively identify the location of a person that is lost or has an emergency that is globally enabled, and does not require the use of a cell phone or connection to a cellular network.

BRIEF DESCRIPTION OF THE DRAWINGS

The various features, functionalities and practical advantages of the present invention may be more readily understood with reference to the following detailed description taken in conjunction with the accompanying drawings, wherein like reference numerals designate like structural elements, and in which.

DETAILED DESCRIPTION

Disclosed are systems, apparatus and methods that transmit the location of a person, and optionally, a message, to a remote site, in a manner that is independent of cellular networks. The systems and methods are relatively inexpensive to implement and thus cost-effectively identify the location of a person that is lost or has an emergency. The systems and methods function to provide consumer satellite messaging and personal locating that is particularly suited for emergency situations. The systems and methods implement personal locating that communicates to others that the user is in trouble and exactly where the user is. The systems and methods provide a cost-effective, emergency location solution for anglers, hikers, climbers, hunters, campers, boaters and others that journey to remote locations that typically have no cellular service.

Reduced-to-practice embodiments of the systems and methods may be used in approximately 99% of the Earth's surface. The systems and methods may be used to communicate from individuals to 911 emergency personnel. Reduced-to-practice embodiments of the systems are waterproof, buoyant, small, having a size on the order of a wallet, are lightweight, on the order of 6 ounces or so, can operate in temperatures ranging from −40° F. to +85° F., and at altitudes from −300 feet to over 21,000 feet, and are resistant to humidity and salt.

In a dire emergency (911) situation, exemplary systems and methods may be used to page for help, sending a users location and an SOS message every 5 minutes, for example, until cancelled, to an emergency center. Emergency operators at the emergency center respond to the emergency message to notify response agencies such as search and rescue, local 911 operators, the Coast Guard or other government branch, or other emergency responder.

In less than dire emergency (Help) situation, exemplary systems and methods may be used to send the user's location and a "Help" message to identified friends and family who will receive SMS, web and e-mail messages.

In situations where a person wants to notify others that he or she is okay, a "SPOTCheck" function sends your location and an "OK" message to identified friends and family. This may be used to let people know you've arrived at a destination, or to save unlimited waypoints to a web page using Google™ Maps, for example.

Exemplary systems and methods may implement a "SPOT-Cast" function that broadcasts the user's location to the users web page every 10 minutes for 8 hours. Using Google™ Maps, for example, on the web page, allows others to access and watch your progress, or allows the user to view his or her progress after they completed the trip.

Reduced-to-practice embodiments of the systems and methods send the user's GPS coordinates via satellite to another location without relying on cellular systems. The systems and methods are user controlled. The user determines and controls who gets transmitted messages, and when and where they are sent. The web service, for example, allows the user to change preferences anytime.

In 911 situations, the systems and methods allow the user to send location coordinates to a emergency service center. The emergency service center notifies emergency responders such as local 911, Coast Guard or other rescue services, so that help can be sent. This option may be used in life threatening or other critical emergencies. The user's location is determined and sent to the emergency service center every 5 minutes until cancelled.

Figure 1:
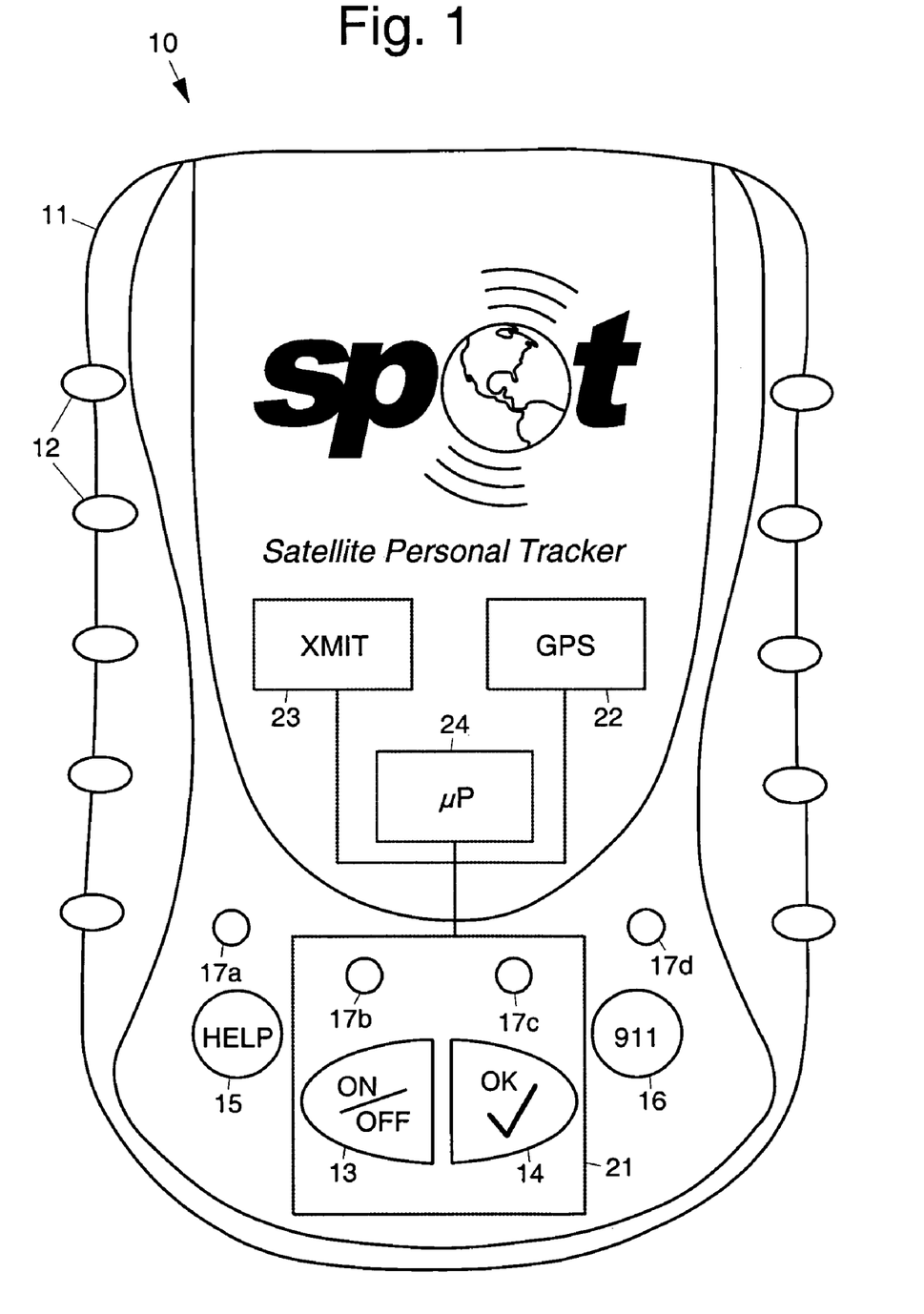
FIG. 1 illustrates an exemplary personal locating device.

Referring to the drawing figures, FIG. 1 illustrates an exemplary personal locating device 10 or personal locator 10. The exemplary personal locator 10 is a small device that is carried by a person. The personal locator 10 is used to send messages that include the user's location as determined by an integral GPS receiver 22. A Simplex Remote Telemetry Back Office 36, or back office 36, (FIG. 4) forwards these messages to user-designated email addresses (computers 34), short message service (SMS) messages to selected cell phones 35, and to a 911 emergency service.

As is shown in FIG. 1, the personal locator 10 comprises a housing 11, which is preferably made of plastic, for example. The housing 11 is preferably waterproof and buoyant. The housing 11 may have an optional belt clip (not shown) disposed on its rear surface. A plurality of buttons 13, 14, 15, 16 are provided on the housing 11 including an on/off button 13, an OK/check button 14, a help/cancel help button 15, and a 911 emergency button 16. A plurality of red/green light emitting diodes (LEDs) 17a-17d are provided on the housing 11 that correspond to each of the plurality of buttons 13-16.

Figure 2:
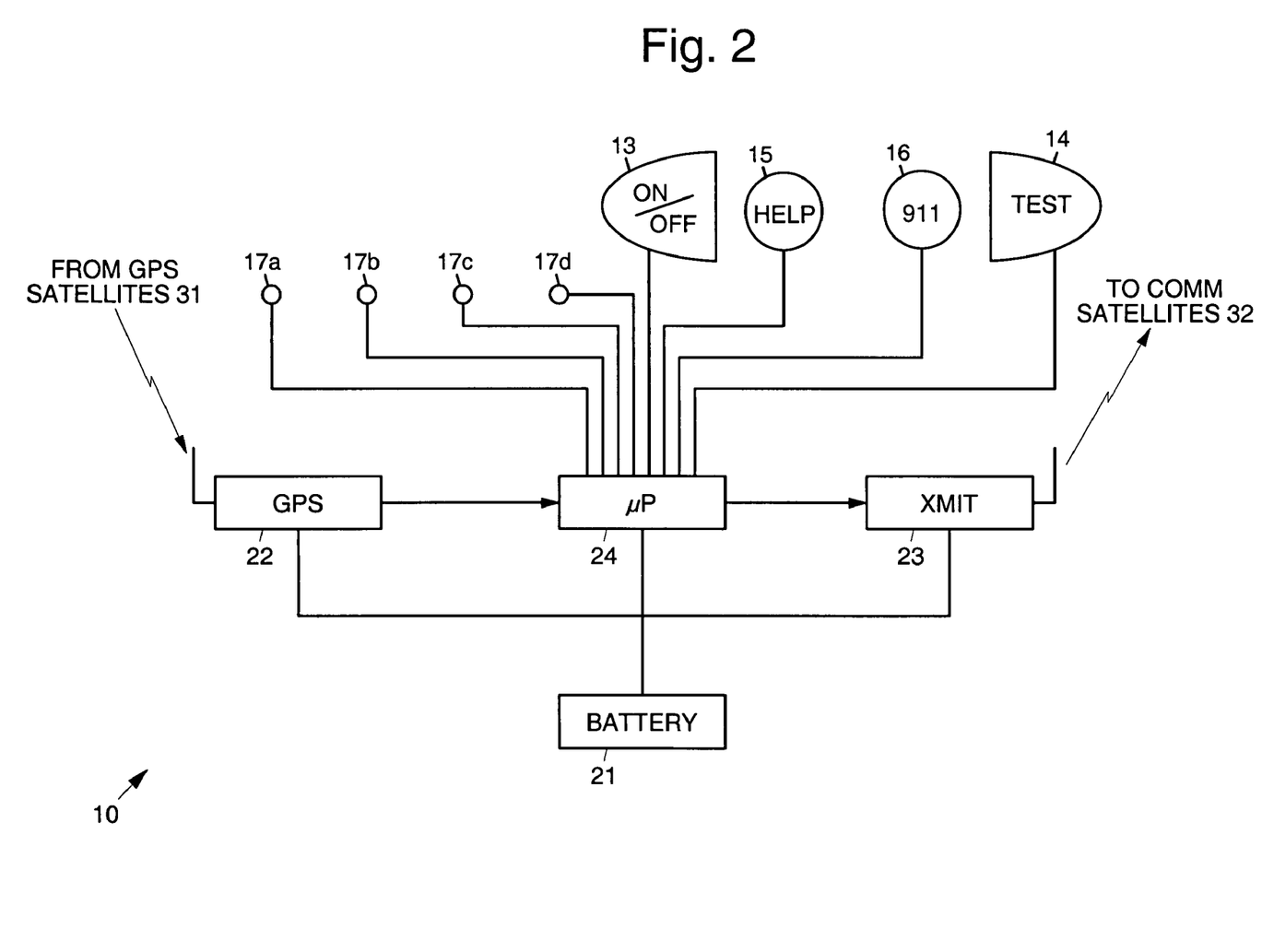
FIG. 2 is a schematic of the electronics employed in the personal locating device.

Electronic circuitry is disposed within the housing 11, and FIG. 2 is a schematic showing the electronic circuitry employed in the personal locator 10. The electronic circuitry includes a battery 21, a global positioning system (GPS) receiver 22, a satellite transmitter (XMIT) 23, and a microprocessor (μP) 24 that interfaces with the various components to control operation of the personal locator 10. The microprocessor 24 is coupled to and drives a plurality of light emitting diodes (LEDs) 17a-17d. The microprocessor 24 is coupled to and receives signals from the plurality of buttons 13, 14, 15, 16. The microprocessor 24 receives GPS signals from the GPS receiver 22 that are derived from GPS satellites 31. The microprocessor 24 sends output signals to the satellite transmitter 23 for transmission to a gateway 33 via a communication (COMM) satellite 32. The communication satellite 32 may be one of a number of low earth orbiting (LEO) satellites, for example, operated by the assignee of the present invention, for example. Although these GPS receiver 22, microprocessor 24, and transmitter 23 are shown as separate units, the functions may be spread across different physical units or integrated into one or two physical units.

Figure 3:
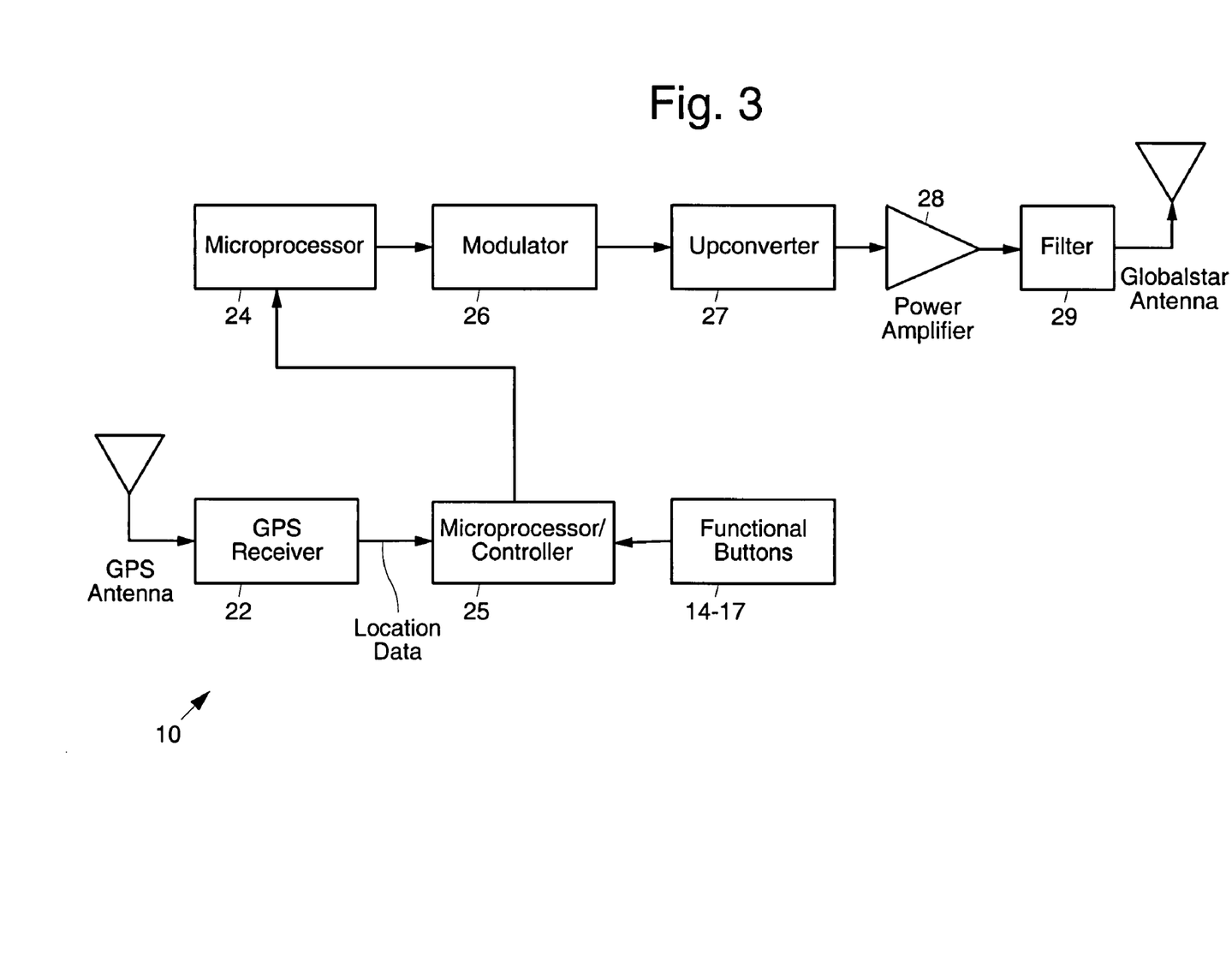
FIG. 3 illustrates details of the electronics employed in the personal locating device.

FIG. 3 illustrates details of the electronics employed in the personal locator 10. As is illustrated in FIG. 3, the GPS receiver 22 is coupled to a GPS antenna used to receive signals from the GPS satellites 31. Outputs signals from the GPS receiver 22 provide location data indicative of the location of the personal locator 10. The location data is input to a microprocessor controller 25 (which may be part of the microprocessor 24). The function buttons 14-17 are coupled to the microprocessor controller 25.

In the diagram shown in FIG. 3, the microprocessor controller 25 is coupled to, controls, and provides inputs to the microprocessor 24. The microprocessor 24 outputs signals that are coupled to a modulator 26. The signal output of the modulator 26 is coupled to an upconverter 27 that upconverts the signal for transmission. The upconverted signal is coupled to an amplifier 28 that amplifies the upconverted signal for transmission. The amplified, upconverted signal is applied to a filter 29 and is coupled to an antenna for transmission to the communication satellite 32. Again, can be spread or integrated.

Figure 4:
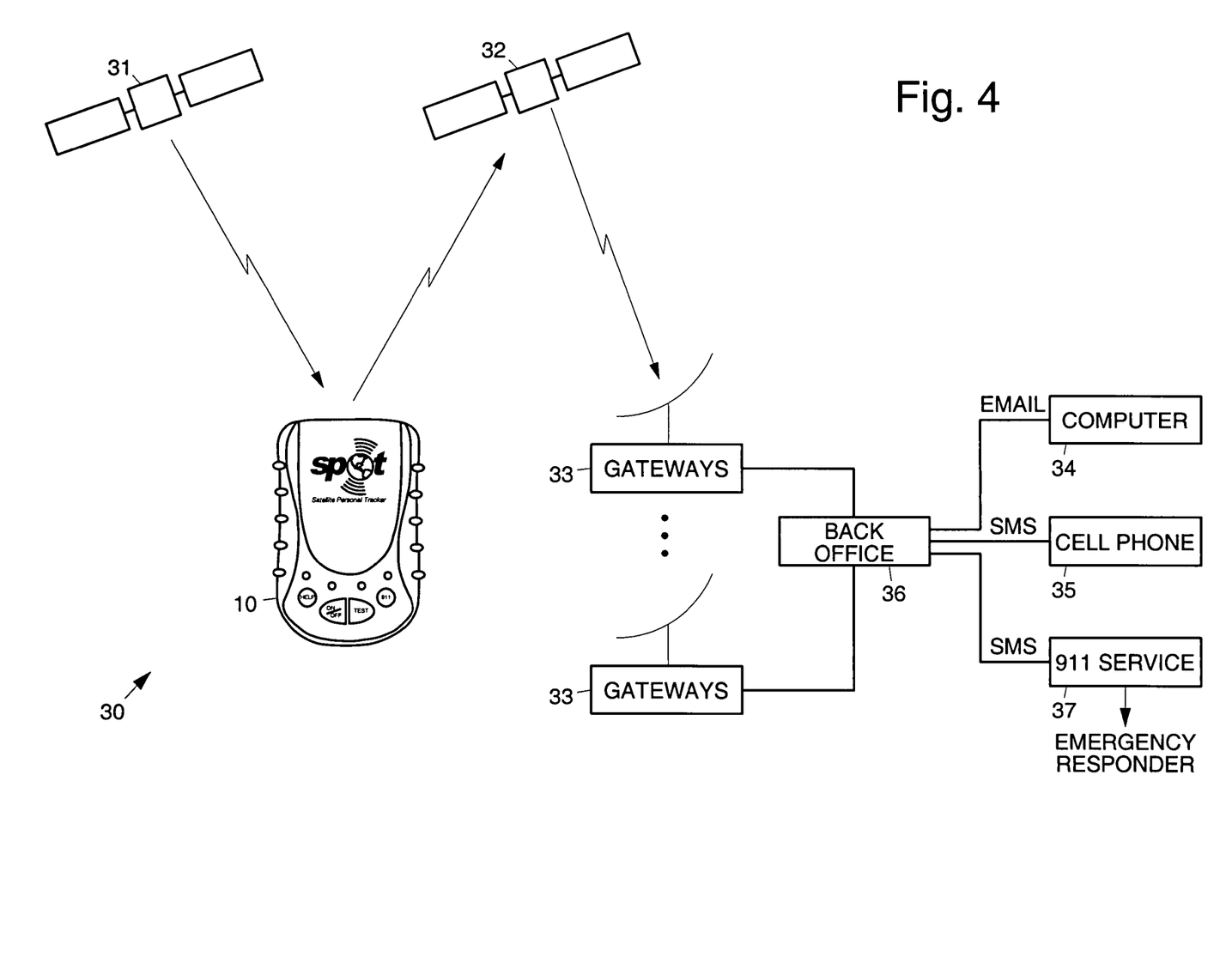
FIG. 4 illustrates components of an exemplary locating system employing the personal locating device.

FIG. 4 illustrates components of an exemplary locating system 30 employing the personal locator 10, the GPS satellites 31, one or more communication satellites 32, and the Simplex Remote Telemetry Back Office 36. As is illustrated in FIG. 4 the personal locator 10 receives GPS signals from the GPS satellites 31 and processes those signals to generate location data. The location data, along with an operating mode signal indicative of the status of the person using the personal locator 10, are configured as a message and transmitted to the one or more communication satellite 32. The communication satellite 32 receives the message, translates the message to a different frequency, amplifies the message, and transmits the message to one or more gateways 33. The one or more gateways 33 receive and demodulate the message to produce a digital message (comprising the GPS location and button information), and send the digital message to the Simplex Remote Telemetry Back Office 36. At the Simplex Remote Telemetry Back Office 36, the digital message is processed to determine what to do with the message. If the message relates to an emergency, the back office 36 sends it to an Emergency Service Provider 37; if it is an OK/Help, etc, the back office 36 sends it to destinations identified in list of email addresses and cell phone numbers.

In particular, the Simplex Remote Telemetry Back Office 36 generates an email message that is sent to one or more designated email addresses (computers 34), a short message service (SMS) message that is sent to one or more designated cell phones 35, or an SMS message that is sent to a 911 emergency center 37. Where the message is sent depends upon the situation (mode) that the personal locator 10 is in, i.e., whether the user is OK and is sending his or her location to loved ones or is letting recipient know that he or she has arrived at a destination, that he or she needs help, or that he or she is in a dire emergency situation.

There are a number of diversity scenarios that may occur when the personal locator 10 transmits a message to a satellite 32. In one instance, the message is received on only one receive beam of the satellite 32 and is transmitted to only one gateway 33. In another instance, the message is received on only one receive beam of the satellite 32 and is transmitted to multiple gateways 33. In another instance, the message is received on multiple receives beams of one satellite 32 and is transmitted to only one gateway 33. In another instance, the message is received on multiple receives beams of one satellite 32 and is transmitted to multiple gateways 33. In another instance, the message is received by one or more beams of multiple satellites 32, and each satellite 32 transmits all information to one or more gateways 33. This last diversity scenario contemplates any combination of satellites 32 and gateways 33. For example, one satellite 32 transmits to only one gateway 33 while another satellite 32 transmits to three gateways 33.

The personal locator 10 is configured to operate as a function of the programming of the microprocessor 24. The microprocessor 24 is programmed to implement various operating modes of the personal locator 10, which respond to button presses and activate appropriate LEDs 17a-17d to alert the user. Operation of the personal locator 10 and the different operating modes that the microprocessor 24 may be programmed to provide are discussed in more detail below. Such programming is generally routine for those skilled in microprocessor programming and specifics regarding the programming will not be discussed in detail herein.

The On/Off button 13 turns battery power on or off. The OK/Check button 14 sends an OK/Check mode message and activates or cancels Track mode depending upon how long button 14 is pressed. The Help button 15 sends a Help or Cancel Help mode message depending upon how long button 15 is pressed. The 911 Emergency button 16 sends a 911 Emergency or Cancel 911 Emergency mode message depending upon how long the button 16 is pressed.

A reduced-to-practice embodiment of the personal locator 10 has ten operating modes. These operating modes include (1) OK/check, (2) Help, (3) Cancel Help, (4) 911 Emergency, (5) Cancel 911 Emergency, (6) Combined Help and 911 Emergency, (7) Combined cancel Help and cancel 911 Emergency, (8) Combined 911 Emergency and cancel Help, (9) Combined Help and cancel 911 Emergency, and (10) Track. The personal locator 10 transmits a unique message associated with each of the operating modes. The personal locator 10 is configured to transmit an eight byte message, for example.

One bit (bit 2, i.e., the third bit, for example) of one byte of the message is used to indicate battery state: good or bad. A good battery state is indicated by a 0 for the bit. A bad battery state is indicated by a 1 for the bit.

The On/Off button 13 is depressed to turn the personal locator 10 on and off. When the On/Off button 13 is pressed and the personal locator 10 is turned on, the personal locator 10 applies power and executes a self test. The personal locator 10 is configured so that none of the modes in table 1 are activated unless power has been turned on and locator 10 unit passes all tests.

In an exemplary embodiment, when power is applied to the personal locator 10, the appropriate LED (1) blinks green every three seconds to indicate the battery 21 is on, the battery 21 has adequate charge, and the personal locator 10 passes self test, or (2) blinks red every three seconds to indicate the battery charge is low, or (3) blinks the OK/Check LED 17c red every second to indicate the personal locator 10 failed the self test, and (4) blinks as appropriate until the power is turned off. After turn-on, depressing the On/Off button 13 and held for three seconds removes power and cancels all active transmissions.

Once the personal locator 10 is in operation, the OK/Check button 14 may be pressed between zero and five seconds. The associated LED 17c blinks every three seconds in synch with the On/Off LED 17b until the conclusion of the first attempt to obtain a GPS fix and then, blinks every three seconds in synch with the On/Off LED 13 if the unit has a GPS fix, or blinks every two seconds asynchronous with the On/Off LED 13 if the unit does not have a GPS fix.

The associated LED turns solid green for five seconds while a message is transmitted, the personal locator 10 transmits three redundant OK/Check mode message with latitude/longitude information, the OK/Check mode message sets the message mode according to Table 1, and the associated LED turns off after the messages are transmitted.

In the event the personal locator 10 fails to obtain a GPS fix on its first attempt when in OK/Check mode, it makes up to two more attempts (a total of three attempts) at five minute intervals. Upon successfully obtaining a GPS fix, the personal locator 10 transmits three redundant OK/Check messages as described above. If the personal locator 10 makes three unsuccessful attempts to obtain a GPS fix, it exits the OK/Check mode without transmitting.

The Help button 15 activates Help mode when it is depressed for two seconds. When the Help mode is activated, the associated LED 17a blinks every three seconds in synch with the On/Off LED 17b until the conclusion of the first attempt to obtain a GPS fix and then, blinks every three seconds in synch with the On/Off LED17b if the unit has a GPS fix, or blinks every two seconds asynchronous with the On/Off LED 17b if the unit does not have a GPS fix.

The associated LED changes to solid green for five seconds when the personal locator 10 transmits the Help mode message, the personal locator transmits one Help mode message with latitude/longitude information every five minutes for one hour or until canceled, the Help mode message sets the message mode according to Table 1, and the LED turns off after the last message.

The Cancel Help mode is activated when the Help button 15 is pressed and held for three seconds. When the Cancel Help mode is activated, the associated LED blinks red every second until the unit has a GPS fix, the associated LED changes to solid red for five seconds when the personal locator 10 transmits each redundant Cancel Help mode message, the personal locator 10 stops sending Help mode messages, the personal locator 10 transmits three redundant Cancel Help mode message without latitude/longitude information, the Cancel Help mode message sets the message mode according to Table 1, and the LED turns off after the Cancel Help messages are sent.

The 911 Emergency mode is activated when the 911 Emergency button 16 is pressed and held for two seconds. When the 911 Emergency mode is activated, the associated LED 17d blinks every three seconds in synch with the On/Off LED 17b until the conclusion of the first attempt to obtain a GPS fix and then, blinks every three seconds in synch with the On/Off LED 17b if the unit has a GPS fix, or blinks every two seconds asynchronous with the On/Off LED 17b if the unit does not have a GPS fix.

The LED changes to solid green for five seconds when the personal locator 10 transmits the 911 Emergency mode message, the personal locator 10 transmits one 911 Emergency mode message with latitude/longitude information every five minutes until canceled, and the 911 Emergency mode message sets the message mode according to Table 1.

The Cancel 911 Emergency mode is activated when the 911 Emergency button 16 is pressed and held for three seconds. When the Cancel 911 Emergency mode is activated, the associated LED 17d blinks red every second until the unit has a GPS fix, the associated LED changes to solid red for five seconds when the personal locator 10 transmits each redundant Cancel 911 Emergency mode message, the personal locator 10 stops sending 911 Emergency mode messages, the personal locator 10 transmits three redundant Cancel 911 Emergency mode message without latitude/longitude information, the Cancel 911 Emergency mode message sets the message mode according to Table 1, and the LED turns off after the Cancel 911 Emergency messages are sent.

When the Help mode is activated while the personal locator 10 is in the 911 Emergency mode, or when the 911 Emergency mode is activated when the personal locator 10 is in the Help mode, the personal locator 10 activates the Combined Help-911 Emergency mode. In the Combined Help-911 Emergency mode, the 911 Emergency LED 17d and the Help LED 17a both blink every three seconds in synch with the On/Off LED 17b until the conclusion of the first attempt to obtain a GPS fix and then, blink every three seconds in synch with the On/Off LED 17b if the unit has a GPS fix, or blink every two seconds asynchronous with the On/Off LED 17b if the unit does not have a GPS fix.

Both LEDs 17a, 17d change to solid green for five seconds when the personal locator 10 transmits the Combined Help-911 Emergency mode message, the personal locator transmits one Combined Help-911 Emergency mode message with latitude/longitude information every five minutes until canceled, and the Combined Help-911 Emergency message mode is set according to Table 1.

After the personal locator 10 has been in the Combined Help-911 Emergency mode for one hour, it switches to the 911 Emergency mode, and stops sending Combined Help-911 Emergency mode messages.

If the Cancel Help mode is activated by pressing and holding the Help button 15 for three seconds, while the personal locator 10 is in the Combined Help-911 Emergency mode, the personal locator 10 sends three sequential Combined 911 Emergency/Cancel Help messages as defined in Table 1 at five minute intervals, wherein the three Combined 911 Emergency/Cancel Help messages contains current GPS location data, and upon completion of the three Combined 911 Emergency/Cancel Help messages enters the 911 Emergency mode.

If the Cancel 911 Emergency mode is activated by pressing and holding the 911 Emergency button 16 for three seconds, while the personal locator 10 is in the Combine Help-911 Emergency mode, the personal locator 10 sends three sequential Combined Help/Cancel 911 Emergency messages as defined in Table 1, wherein the three Combined Help/Cancel 911 Emergency messages contain current GPS location data, and upon completion of the three Combined Help/Cancel 911 Emergency messages enters the Help mode for the remaining duration of the one hour of help interval.

The personal locator 10 activates the Track mode if the OK/Check button 14 is pressed and held for greater than five seconds. When the Track mode is activated, the associated LED blinks every three seconds in synch with the On/Off LED 17b until the conclusion of the first attempt to obtain a GPS fix and then, blinks every three seconds in synch with the On/Off LED 17b if the unit has a GPS fix, or blinks every two seconds asynchronous with the On/Off LED 17b if the unit does not have a GPS fix.

The associated OK/Check LED 14 turns solid green for five seconds while a Track message is transmitted, the personal locator 10 transmits one Track mode message with latitude/longitude information every ten minutes for 24 hours, the Track mode message is set according to Table 1, and the OK/Check LED 14 turns off after the last message is transmitted.

The Track mode is canceled if the OK/Check button 14 is pressed and held for five seconds. When the Track mode is canceled, the OK/Check LED 17c blinks red every second for ten seconds, the OK/Check LED17c turns solid red for five seconds, and the OK/Check LED 17c turns off.

If either the 911 Emergency button 16 or the Help button 15 is pressed while the personal locator 10 is in the Track mode, the personal locator 10 stops sending Track mode messages and begins sending the appropriate emergency mode messages described above.

In the event that a user activates Cancel 911 Emergency mode from 911 Emergency mode before any 911 Emergency message has been transmitted, the personal locator 10 blinks the 911 Emergency LED 17d Red for ten seconds, then illuminates the LED 17d red for five seconds, then turns the LED 17d off.

In the event that the user activates Cancel Help mode from Help mode before any Help message has been transmitted, the personal locator 10 blinks the Help LED Red 17a for ten seconds, then illuminates the LED 17a red for five seconds, then turns the LED o17a off.

In all modes, the personal locator 10 uses new GPS fix information for each message. In the Help, 911 Emergency, Combined and Track modes, the personal locator 10 does not transmit a scheduled message if it does not have a GPS fix. In Cancel modes, the personal locator 10 transmits whether or not it has a GPS fix. The personal locator 10 increments a unique message number (UMN) with each transmission.

In all modes, when an LED 17a-17d blinks, it blinks every three seconds in synch with the On/Off LED until the conclusion of the first attempt to obtain a GPS fix and then, blinks every three seconds in synch with the On/Off LED if the personal locator 10 has a GPS fix, or blinks every two seconds asynchronous with the On/Off LED if the personal locator 10 does not have a GPS fix.

The personal locator 10 is configured to use GPS location information to determine which RF channel to use. Channel A is used in North America, except near radio astronomy sites (RAS) sites, Channel C is used in North America near RAS sites, and Channel C is used outside of North America.

The personal locator 10, when a lithium battery 24 is installed, is configured to float. The personal locator 10 is preferably waterproof. The personal locator 10 is relatively light in weight, and is on the order of 7.5 ounces. The personal locator 10 is relatively small, and reduced to practice embodiments are on the order of 4⅜ inches high, 2¾ inches wide, and 1¾ inches thick. Each personal locator 10 has an Electronic Serial Number (ESN) and an associated random Authentication Code that may be a random 8-digit number, for example. Reduced to practice embodiments of the personal locator 10 have an operating temperature range of from −20° C. to +85° C., can operate at an altitude of from −100 meters to +6500 meters, and can withstand MIL-STD-810E humidity and salt fog tests, SAE J1455 vibration tests and one meter drop tests.

Figure 5:
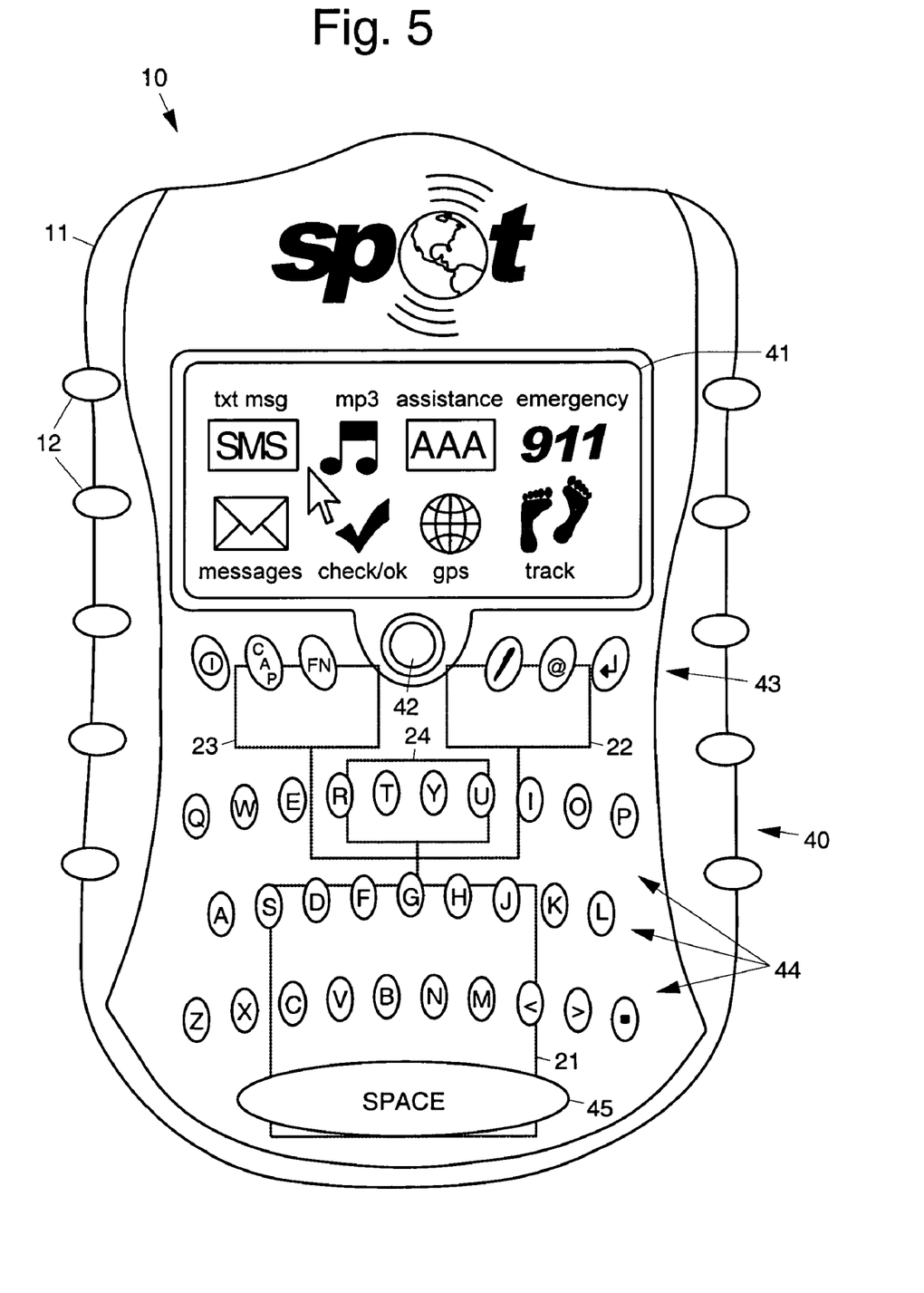
FIG. 5 illustrates another exemplary personal locating device.

FIG. 5 illustrates another exemplary personal locator 10. This embodiment of the personal locator 10 has basically the same components as the device 10 described with reference to FIG. 1, but comprises a keypad 40 and display 41 instead of the various buttons 13, 14, 15, 16 and LEDs 17a-17d. The keypad 40 comprises a Qwerty keyboard 44 a "space" (space bar) button 45 and a plurality of function buttons 43. The various buttons of the keypad 40 are coupled to the microprocessor 24. A power-on button 42 is provided below the display 41. The display 41 presents a plurality of selectable function icons or buttons to the user including "txt msg" (SMS) for sending an SMS message, "mp3 for playing music, "assistance" (AAA) for transmitting an help message, "emergency" (911) for transmitting an emergency message, "messages" (an envelope) for typing a message, "check/ok" (check mark) for transmitting an OK message, "gps" (a world icon or button) for showing current GPS coordinates, and "tack" (bard feet) for transmitting a track message. A cursor 46 is presented on the display that is moveable to select the selectable function icons or buttons. This embodiment of the personal locator 10 allows the user to type and transmit a desired message in addition to transmitting preprogrammed messages, as does the locator 10 described with reference to FIG. 1. In addition, a message entered via the keypad 40 to any person the user wants via a text message transmission to a remote wireless device over the satellite communications link, or to an email account.

The personal locator 10 described with reference to FIG. 5 may be modified to replace the transmitter 23 with a transceiver (or add a receiver) that allows two-way transmission and reception of messages by the personal locator 10. This modification allows a person that is remotely located from the personal locator 10 to forward a message to the to notify the user of emergency-related information, for example. For instance, this modified personal locator 10 would allow a responder to an emergency message transmitted by the user to let the user know that help is on the way, such as by transmitting a message stating "coming in 90 minutes will 5 gallons of gas," for example.

Figure 6:
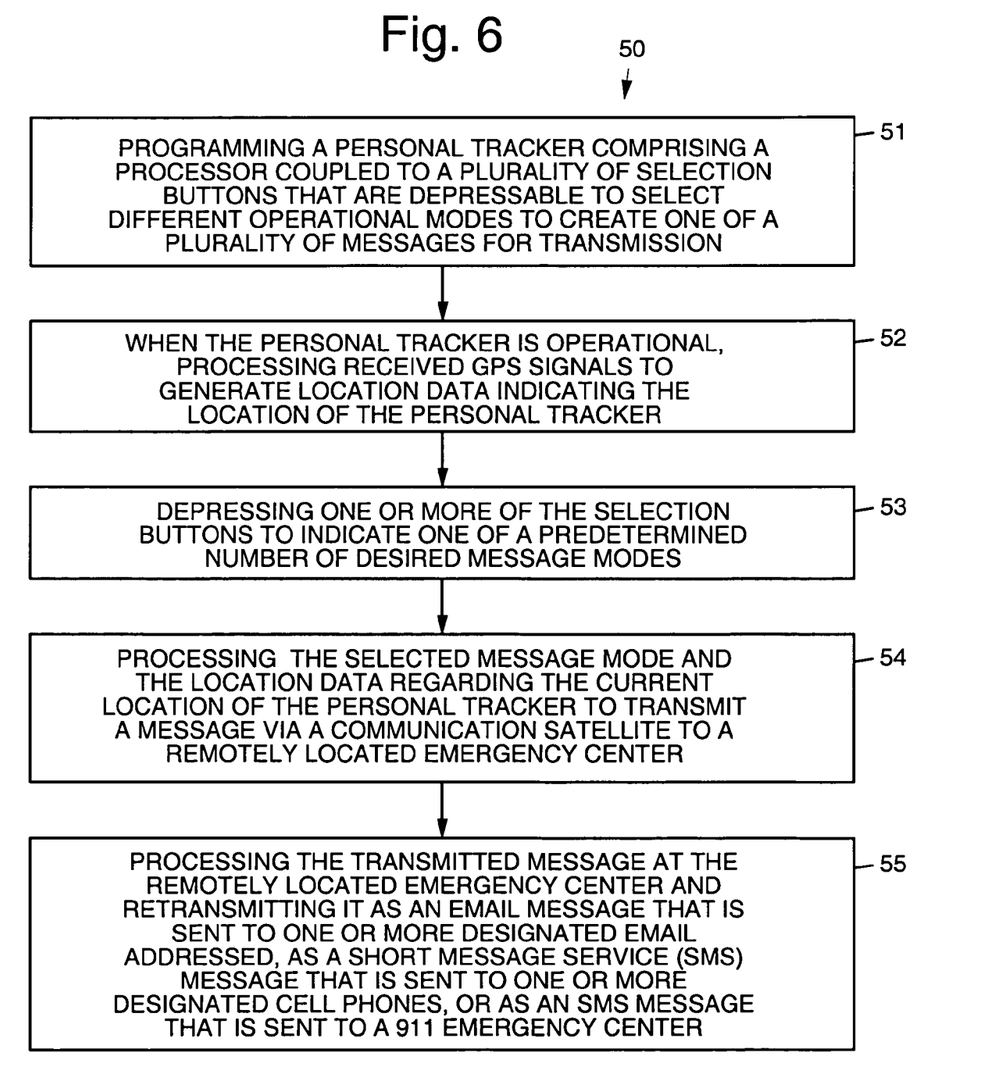
FIG. 6 is a flow diagram that illustrates an exemplary locating method.

FIG. 6 is a flow diagram that illustrates an exemplary locating method 50 using a personal locator 10. The exemplary method 50 may be implemented as follows.

A personal locator 10 comprising a processor coupled to a plurality of selection buttons that are depressible to select different operational modes is programmed 51 to create one of a plurality of messages for transmission depending upon the selection buttons that are depressed. When the personal locator 10 is operational, GPS signals are received and processed 52 to generate location data indicative of the location of the personal locator 10. One or more of the selection buttons are depressed 53 by a user to select one of a predetermined number of message modes, including OK, Track, Help, 911 Emergency, and combined Help and 911 Emergency, for example. The selected message mode and the location data regarding the current location of the personal locator 10 are processed 54 to generate and transmit a message via a communication satellite to a remotely located gateway 33 and then the gateway 33 sends the message to the Simplex back office 36. The transmitted message is processed 55 at the remotely located back office 36 and is retransmitted or sent as an email message that is sent to one or more designated email addresses (i.e., computers 34), as a short message service (SMS) message that is sent to one or more designated cell phones 35, or sent to a 911 emergency center 37.

Thus, systems, apparatus and methods for tracking or locating a person that is lost or has an emergency have been disclosed. It is to be understood that the above-described embodiments are merely illustrative of some of the many specific embodiments that represent applications of the principles discussed above. Clearly, numerous other arrangements can be readily devised by those skilled in the art without departing from the scope of the invention.

What is claimed is:
1. Personal locating apparatus comprising:
a housing;
a plurality of buttons Including an on/off button for turning the apparatus on and off, and a plurality of selectable buttons, that are selectable to select and deselect one of a predetermined number of operational modes of the apparatus;
a global positioning system (GPS) receiver for processing GPS signals received from GPS satellites to generate location data indicative of the location of the apparatus;
a satellite transmitter coupled to the processor for transmitting a personal location signal including the location data and the selected operational mode signal of a number of different operational mode signals of the apparatus to a remote location via one or more communication satellites, wherein the remote location is configured to create and forward a corresponding message to one or more designated locations based upon the selected operational mode;
a processor coupled to the GPS receiver and the satellite transmitter that is programmed to respond to the buttons that are selected to generate the selected operational mode signal, process the location signals from the GPS receiver and the selected operational mode signal to generate the personal location signal for transmission to the remote location, and for transmitting the personal location signal to the remote location via the one or more communication satellites, wherein said remote location is configured to generate the corresponding message from the location data and the selected operational mode and forward the corresponding message to recipients selected from a list of designated recipients associated with the selected operational mode.

2. The apparatus recited in claim 1 further comprising a plurality of indicator lights that are respectively associated with the plurality of selectable buttons.

3. The apparatus recited in claim 1 wherein the plurality of selectable buttons comprise art OK button, a help button and an emergency button.

4. The apparatus recited in claim 1 wherein the personal location signal comprises one of a plurality of preprogrammed signals indicative of the status of a user of the apparatus.

5. The apparatus recited in claim 1 wherein the selectable buttons comprise a keypad and selection buttons for selecting and deselecting the operational modes, and wherein the apparatus further comprises a display that presents a plurality of selectable function icons.

6. The apparatus recited in claim 1 wherein the personal locating signal comprises one of a plurality of preprogrammed messages indicative of the status of a user of the apparatus or a message that is entered by way of the keypad by the user.

7. A personal locating system comprising:
a plurality of GPS satellites for generating GPS signals that are used to determine position;
one or more communication satellites for transmitting a personal locating signal;
a remotely located processing center configured for receiving and processing the personal locating signal and for creating and forwarding a corresponding message to at least one designated location based upon one selectable operational mode of a number of different selectable operational modes; and
a locating device comprising a plurality of selectable elements that are selectable to select and deselect one of said number of different selectable operational modes of the locating device;
a global positioning system (GPS) receiver for processing GPS signals received from the GPS satellites to generate location data indicative of the location of the locating device, a satellite transmitter coupled to the processor for transmitting the personal locating signal including the location data and the selected operational mode of the locating device; and processor coupled to the GPS receiver and the satellite transmitter that is programmed to respond to the elements that are selected to generate the selected operational mode signal, process the location signals from the GPS receiver and the selected operational mode signal to generate the personal locating signal for transmission to the remotely located processing center, and for transmitting the personal locating signal to the remotely located processing center via the one or more communication satellites;

wherein said remotely located processing center is configured to generate the corresponding message from the location data and the selected operational mode and forward the corresponding message to recipients selected from a list of designated recipients associated with the selected operational mode.

8. The system recited in claim 7 wherein the remotely located processing center forwards an email message to one or more email addresses.

9. The system recited in claim 7 wherein the remotely located processing center forwards a short message service (SMS) message to one or more selected cell phones.

10. The system recited in claim 7 wherein the remotely located processing center notifies a 911 emergency service with at least the location of the emergency.

11. The system recited in claim 7 wherein the personal locating signal is transmitted by way of the one or more communication satellites to multiple remote locations.

12. The system recited in claim 7 wherein the selectable elements comprise a keypad and selection buttons for selecting and deselecting the operational modes, and wherein the device further comprises a display that presents a plurality of selectable function icons.

13. The system recited in claim 12 wherein the locating device further comprises a receiver for receiving a remotely-generated message, which remotely-generated message is displayed on the display.

14. The system recited in claim 7 wherein the personal locating signal comprises one of a plurality of preprogrammed messages indicative of the status of a user of the device or a message that is entered by way of the keypad by the user.

15. A personal locating method comprising:

programming a personal locator comprising a processor coupled to a plurality of selection elements that are selectable to define different operational modes and that create a message for transmission depending upon the selection elements that are depressed;

receiving and processing GPS signals to generate location data indicative of the location of the personal locator;

selecting one or more of the selection elements to select one of a number of different message modes;

processing the selected message mode and the location data regarding the current location of the personal locator to generate a personal locating message;

transmitting the personal locating message via one or more communication satellites to a remotely located processing center;

processing the transmitted message at the remotely located processing center to generate and forward a different message including the location data and the selected message mode to one or more designated recipients based upon said selected message mode.

16. The method recited in claim 15 wherein the remotely located processing center forwards an email message to one or more email addresses.

17. The method recited in claim 15 wherein the remotely located processing center forwards a short message service (SMS) message to one or more selected cell phones.

18. The method recited in claim 15 wherein the remotely located processing center forwards a short message service (SMS) message to a 911 emergency service.

19. The method recited in claim 15 wherein the personal locating message is transmitted by way of the one or more communication satellites to multiple remote locations.

20. The method recited in claim 15 wherein the selection elements comprise a keypad and selection elements for selecting and deselecting the operational modes, and wherein the personal locator further comprises a display that presents a plurality of selectable function elements.

21. The method recited in claim 20 further comprising: receiving and displaying a remotely-generated message.

22. The method recited in claim 15 wherein the locating message comprises one of a plurality of preprogrammed messages indicative of the status of a user of the apparatus or a message that is entered by way of the keypad by the user.

* * * * *